(12) United States Patent
Tiebel et al.

(10) Patent No.: US 8,721,249 B2
(45) Date of Patent: May 13, 2014

(54) APPARATUS AND METHOD FOR LOADING A PACK STORING DEVICE

(75) Inventors: Peter Tiebel, Bad Abbach (DE); Dieter Wünsche, Straubing (DE)

(73) Assignee: Krones AG, Neutraubling (DE)

( * ) Notice: Subject to any disclaimer, the term of this patent is extended or adjusted under 35 U.S.C. 154(b) by 518 days.

(21) Appl. No.: 12/879,046

(22) Filed: Sep. 10, 2010

(65) Prior Publication Data
US 2011/0064547 A1    Mar. 17, 2011

(30) Foreign Application Priority Data
Sep. 11, 2009  (DE) .................. 10 2009 041 238

(51) Int. Cl.
*B65G 65/00*    (2006.01)

(52) U.S. Cl.
USPC ......................................................... 414/276

(58) Field of Classification Search
USPC .............. 414/267, 276, 807, 796.4, 796.8; 198/580; 193/25 FT
See application file for complete search history.

(56) References Cited

U.S. PATENT DOCUMENTS

| | | | | |
|---|---|---|---|---|
| 2,808,946 A | * | 10/1957 | Just et al. | 198/347.4 |
| 4,708,252 A | * | 11/1987 | Azzi | 211/192 |
| 5,215,421 A | * | 6/1993 | Smith | 414/276 |
| 5,363,310 A | * | 11/1994 | Haj-Ali-Ahmadi et al. | 700/216 |
| 5,385,243 A | * | 1/1995 | Jackson et al. | 209/509 |
| 6,199,720 B1 | * | 3/2001 | Rudick et al. | 221/6 |
| 6,425,226 B1 | * | 7/2002 | Kirschner | 53/445 |
| 6,497,326 B1 | * | 12/2002 | Osawa | 211/59.2 |
| 7,110,855 B2 | * | 9/2006 | Leishman | 700/216 |
| 7,363,104 B2 | * | 4/2008 | Stevens | 700/213 |
| 7,380,651 B2 | * | 6/2008 | Lafontaine et al. | 198/580 |

FOREIGN PATENT DOCUMENTS

| | | |
|---|---|---|
| CN | 2685286 Y | 3/2005 |
| DE | 202006004875 U1 | 7/2006 |
| DE | 202007009400 U1 | 11/2008 |
| DE | 202007016549 U1 | 3/2009 |
| EP | 0043428 A2 | 1/1982 |
| EP | 0183074 A1 | 9/1989 |
| WO | WO-2009068241 A1 | 6/2009 |

OTHER PUBLICATIONS

German Search Report for DE102009041238.7 dated Jul. 16, 2010.
European Search Opinion for Appl. No. 10172199.1, dated Oct. 30, 2013.
European Search Report for Appl. No. 10172199.1, dated Oct. 30, 2013.

* cited by examiner

*Primary Examiner* — Gregory Adams
*Assistant Examiner* — Glenn Myers
(74) *Attorney, Agent, or Firm* — Marshall, Gerstein & Borun LLP

(57) ABSTRACT

A method for loading a pack storing device of an order-picking line with packs, particularly packs of one or a plurality of beverage articles, including providing at least one group of packs, particularly a pallet, especially the at least one group of packs comprising packs at least of a single article, particularly beverage article; and manually loading the pack storing device with at least one pack from the at least one group of packs, particularly a pallet, by one or more operators.

7 Claims, 1 Drawing Sheet

APPARATUS AND METHOD FOR LOADING A PACK STORING DEVICE

CROSS-REFERENCE TO RELATED APPLICATION

The present application claims the benefit of priority of German Application No. 102009041238.7, filed Sep. 11, 2009. The entire text of the priority application is incorporated herein by reference in its entirety.

FIELD OF THE DISCLOSURE

The present disclosure relates to an apparatus and a method for loading a pack storing device of an order-picking line with packs, particularly packs of one beverage article or a plurality of beverage articles.

BACKGROUND

Especially in the beverage industry, packs of one or several beverage articles are often order-picked in a customer-specific way on a pallet. To this end, groups of packs, particularly pallets, must be depalletized and the packs must be supplied to a pack storing device. Thereupon the packs stored in the pack storing device can be used for sequencing and palletizing, e.g. for order-picking, based on a customer order.

Starting from groups of packs, particularly pallets, the pack storing device is normally loaded automatically. However, the automatic loading of the pack storing device requires great efforts both in terms of the necessary mechanical installations and in terms of costs caused by system control as well as data and stock management of the packs. For instance, the costs for automatically loading a pack storing device can amount to more than 30% of the total costs for an automatic order-picking system.

SUMMARY OF THE DISCLOSURE

It is therefore an aspect of the present disclosure to provide an apparatus and a method for loading a pack storing device with packs, particularly packs of one or several beverage articles, which is less demanding with respect to mechanical and/or electronic installations.

The method according to the disclosure for loading a pack storing device of an order-picking line with packs, particularly with packs of one or several beverage articles, comprises the steps of: providing at least one group of packs, particularly a pallet, especially the at least one group of packs, particularly the one pallet, comprising packs at least of a single article, particularly a beverage article, and manually loading the pack storing device with at least one pack from the at least one group of packs, particularly a pallet, by one or more operators.

Since the pack storing device is manually loaded by one or more operators, the demand for necessary mechanical and/or electronic installations can be reduced. This can also reduce the production costs of an order-picking system.

The group of packs may particularly be a pallet, e.g. a production pallet or source pallet, a trolley or a mesh box.

The order-picking line can conform to a mechanical order-picking system. The order-picking line can be automated at least in part. The order-picking line can particularly be configured such that a picking order for forming a sequence of packs is processed automatically, i.e. the sequence of packs is automatically formed, particularly from packs stored in the pack storing device. The formed sequence of packs can be arranged or palletized on a further group of packs, particularly a target pallet.

For instance, a customer may order a pallet comprising packs of different beverage articles, e.g. comprising water, fruit juice and/or alcoholic beverages, such as beer. This customer-specific order can then be processed by the order-picking line automatically or partly automatically. In other words, the order-picking line can prepare the further group of packs automatically or partly automatically from packs stored in the pack storing device.

The further group of packs can particularly be a pallet, e.g. a target pallet, a trolley or a mesh box.

The further group of packs, for instance the customer-specific pallet or target pallet, may be a group of several different packs, particularly a mixed pallet, especially due to specifications given in one or several customer orders or due to specifications given in one or several orders for supporting further internal as well as external business processes, particularly distributing, mounting, repacking, customizing, order-picking, etc.

A pack can conform to the entity of packaged good and packaging. To be more specific, a pack of a beverage article can conform to a beverage and the associated packaging. A pack can also conform to a large pack, a large pack comprising a plurality of single packs. For instance, a pack may be a crate with bottles that are filled with a beverage. A pack may also be a carton or a shrink pack.

The packs can be packs of one or several beverage articles and/or foods, commercial products and/or containers and packets in general.

A group of packs, for instance a production pallet, can be homogeneous. In other words, a group of packs may comprise packs of a single article, for instance beverage articles. Several, particularly two or more, groups of packs, particularly pallets, can be provided, with especially each of the provided groups of packs being homogeneous. Different groups of packs can comprise packs of different beverage articles. The pack storing device can thereby be loaded with packs of different beverage articles.

Alternatively or in addition, the groups of packs may also comprise packs of different articles, particularly different beverage articles. Particularly, the provision of the at least one group of packs may encompass arranging packs of different articles, particularly different beverage articles, on or in the group of packs.

A pack storing device or pack buffer can serve the storage and/or intermediate storage of packs. The pack storing device can particularly comprise one or several storage elements, and it is possible to store one or several packs of a beverage article in each storage element. In other words, different storage elements may be provided for packs of different beverage articles.

The pack storing device can comprise at least one storage lane. In other words, a storage element of the pack storing device can conform to a storage lane.

A storage lane can be configured and/or arranged such that a pack can be driven thereon and/or further transported by the dead weight of the pack, especially to an intended or predetermined area of the storage lane. A conveyor track can particularly conform to a roller conveyor or a roller track. A storage lane can conform in to an oblique plane or can be arranged in an oblique plane. In other words, the storage lane can enclose an angle with the horizontal that is greater than 0°, particularly greater than 2°.

The pack storing device can comprise a plurality of vertically superposed planes. To be more specific, each of the vertically superposed planes can comprise at least one storage lane. Especially two or more, especially three, vertically superposed planes may be provided. The planes of the pack storing device, particularly the storage lanes arranged in the planes, can be configured such that they are ergonomically within the reach of an operator or a worker. Particularly, the lane lengths of the storage lanes can be chosen such that the storage lanes of the superposed planes are staggered in the area of an operator. The storage lanes can be arranged in such a staggered configuration that the one operator or several operators are in a position to deposit the packs at the loading position obliquely from above.

The vertical distance between two vertically superposed planes of the pack storing device can conform to the pack height that can be maximally handled.

The pack storing device, particularly the storage lanes of the pack storing device, can comprise at least one receiving element for receiving at least one pack from one or several operators. This permits a targeted and oriented loading of the pack storing device. For instance, the receiving element can conform to a work plate, particularly a work plate made of easily sliding material. Easily sliding means in this instance that adhesion and/or slide friction of the used material is/are small, especially so that packs can be moved by applying a small force and/or by the dead weight of the pack.

Alternatively or in addition the receiving element may be a roller table or conform to a similar rolling device. The receiving element can comprise a lateral, particularly adjustable, pack guiding means. The pack guiding means can be adjusted in conformity with the dimensions of the pack assigned to the storage lane.

The receiving element can comprise a placement means or conform to a placement means, the placement means being configured such that it facilitates the introduction of the pack into the pack storing device, particularly into a storage lane, for an operator. For instance, the receiving element, particularly comprising a lateral pack guiding means, can be configured and/or arranged such that the pack can be oriented with a defined angle relative to the running direction (a slight rotation can be conducive to an improved transport on the conveying equipment), and/or a defined or predetermined start position can be given or assigned to the pack on the storage lane.

The receiving element can be configured in the form of a drawer. The receiving element can conform to a pack pusher, particularly conform to a manual pack pusher or comprise a pack pusher. A pack pusher can be used for moving a pack out of the inoperative position. In other words, a pack pusher can enable or facilitate momentum transmission to a pack. As a result, the momentum with which the pack is passed into the storage lane can be controlled or fixed, particularly fixed to a predetermined value.

The provision of the at least one group of packs can comprise requesting the at east one group of packs, particularly by one or several operators. Requesting the at least one group of packs can be carried out in a fully or partly automated way. Specifically, one or more operators can control the further supply and/or get instructions regarding demand and quantities for buffer lanes or storage lanes or removal places and can possibly comment on or confirm in these data. The one or several operators may be the one or several operators for manual loading.

Moreover, the method comprises providing a work area for the one or several operators, the work area being arranged and/or configured such that the one or several operators can manually load the pack storing device with the at least one pack from the at least one group of packs. Specifically, the work area can be arranged between the pack storing device and the at least one group of packs.

A plurality of work areas or work regions can also be provided. The work regions for operators can also be superposed repeatedly. Specifically, a plurality of work areas, storage lanes and providing places for groups of packs can be arranged side by side and/or one on top of the other.

Furthermore, the method can comprise an automated further processing of the packs after manual loading. The method can particularly comprise an automatic or automated further transportation of the pack after manual loading.

Furthermore, the disclosure provides an apparatus for loading a pack storing device of an order-picking line with packs, particularly packs of one or a plurality of beverage articles, comprising: a pack storing device, a providing area for providing at least one group of packs, particularly the at least one group of packs comprising packs at least of a single article, and a work area, the work area being arranged and/or configured such that one or several operators can manually load the pack storing device with at least one pack from the at least one group of packs.

The apparatus can particularly be used with one of the above-described methods. The apparatus, particularly the pack storing device, can comprise one or a plurality of the above-described features. Particularly, the pack storing device can comprise at least one storage lane. The pack storing device can comprise a plurality of vertically superposed planes. Moreover, the pack storing device, particularly the storage lanes of the pack storing device, can comprise at least one receiving element for receiving the at least one pack from at least one operator. The at least one pack or the at least one group of packs can comprise one or a plurality of the above-described features.

The apparatus can be configured such that an apparatus for the automated loading of the pack storing device can be retrofitted. To be more specific, the apparatus can comprise a device for the automated or automatic loading of the pack storing device with packs of one or several articles, particularly beverage articles. As a result, one can choose between manual loading and automated loading.

The apparatus may be part of an order-picking line or an order-picking system.

BRIEF DESCRIPTION OF THE DRAWINGS

Further features and advantages are now described with reference to the exemplary figures, of which.

DETAILED DESCRIPTION OF THE PREFERRED EMBODIMENT

Figure 1:
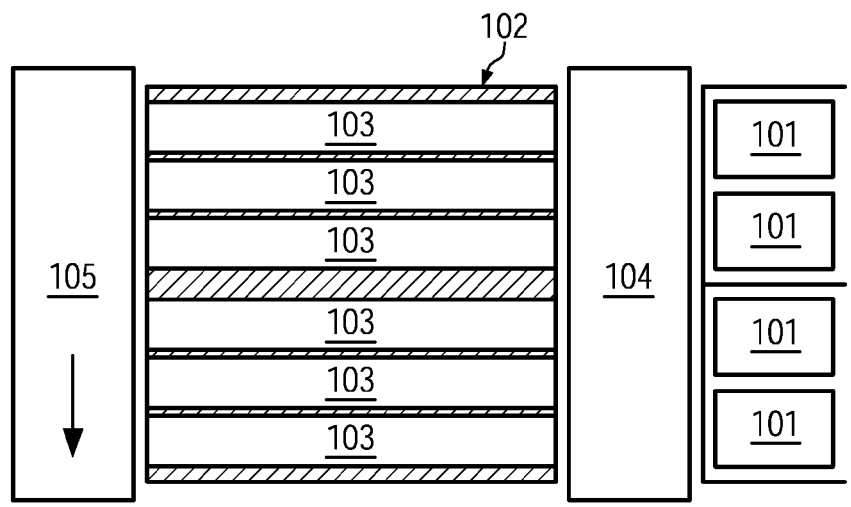
FIG. 1 is a top view on an exemplary system comprising an exemplary pack storing device and an exemplary apparatus for loading the pack storing device.

FIG. 1 illustrates a method for loading a pack storing device with reference to an exemplary system comprising a pack storing device 102, groups of packs 101 and a work area 104 which is arranged between the pack storing device 102 and the groups of packs 101 and from which an operator can manually load the pack storing device 102 with at least one pack from one of the groups of packs 101. FIG. 1 further shows a conveying medium 105 with which packs taken from the pack storing device 102 can be further transported for further handling.

The groups of packs can particularly be production pallets.

The exemplary system shown in FIG. 1 may be part of an order-picking system with which packs can be order-picked in a customer-specific way on a pallet. Packs of one or more beverage articles are exemplarily used, but it is fundamentally possible to use also packs of other articles.

The pack storing device 102 comprises a plurality of storage lanes 103. An operator can homogeneously load the storage lanes 103. In other words, the operator can load each of the storage lanes 103 with packs of only one single beverage article. Different storage lanes 103 can however be loaded with packs of different beverage articles. Different storage lanes 103 can also be loaded with packs of identical articles, particularly beverage articles.

A storage lane 103 can also be loaded with packs of different articles. One or several operators can arrange packs of a group of packs 101 in compliance with one or several picking orders and/or according to the use of the packs of the groups of packs in the storage lanes 103.

The storage lanes 103 can comprise lateral guide elements, so that packs can be guided laterally on the storage lanes 103.

Figure 2:
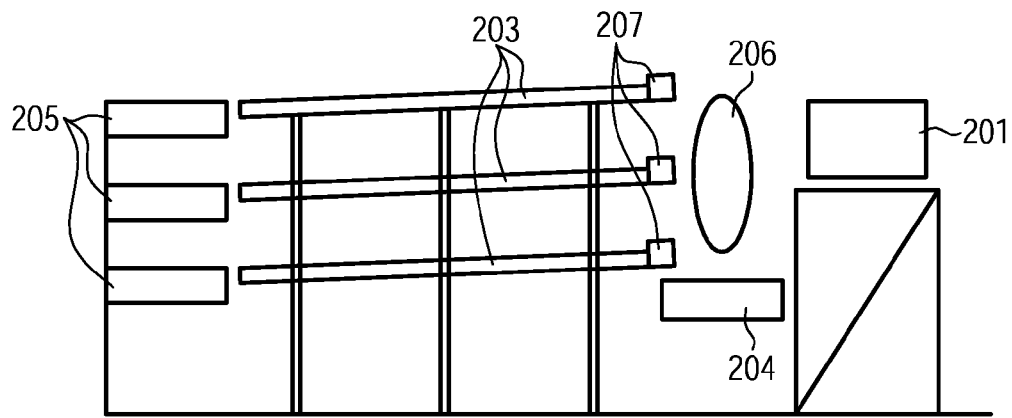
FIG. 2 is a side view of an exemplary system comprising an exemplary pack storing device and an exemplary apparatus for loading the pack storing device.

FIG. 2 shows the exemplary system of FIG. 1 in a side view. The system in FIG. 2 comprises a plurality of vertically superimposed planes, each of the planes comprising at least one storage lane 203. The feasible number of the planes may be given by the constructional conditions of the pack storing device, e.g. constructional height within the pack storing device and in the downstream pack conveying equipment. FIG. 3 shows three superposed planes. Each of the planes shown in FIG. 2 comprises at least one storage lane 203. A conveying medium 205 that enables the further transport of packs taken from the storage lane 203 in a partly or fully automated way is arranged downstream of each storage lane 203.

Each of the storage lanes 203 comprises a receiving element 207. The receiving elements 207 are arranged within the operative area of a worker or operator. Thanks to the receiving elements the targeted and oriented deposition of the packs is facilitated for the operator, and increased wear caused by dynamic loads, e.g. roller wear of the storage lanes, is prevented. Moreover, disorders in the subsequent automatic transportation process can be prevented by the targeted transfer of the packs. When a storage lane comprises a receiving element with lateral guiding means, it is possible that the storage lane itself is without any lateral guide elements.

FIG. 2 further illustrates an operator 206 on a work area 204, the work area 204 being arranged between the groups of packs 201 and the storage lanes 203 of the pack storing device. The work area 204 may comprise a non-slip floor cover. Moreover, some kind of lighting may be provided for the work area 204. The work area 204 can be adjustable in its height relative to the pack storing device and/or the groups of packs 201. As a result, the working height can be adapted to the size of the respective operator.

A fresh supply with groups of packs is possible by way of forklift handling or by means of automatic pallet transport systems. For controlling the fresh supply with groups of packs, and for stock management of the pack storing device, a visual inspection of the filling levels of the groups of packs and/or the pack storing device may be provided. The control of the fresh supply may comprise requesting groups of packs. The control of the fresh supply of groups of packs can be partly or fully automated and can particularly encompass an automatic detection of the filling levels of the groups of packs and/or the pack storing device. To this end, appliances such as lists, scanners, RFID technology, terminals, display elements as well as speech output and input systems may be used.

It goes without saying that features indicated in the previously described embodiments are not limited to these special combinations and are also possible in any desired different combination.

The invention claimed is:

1. A method for loading a pack storing device of an order-picking line with packs of one or a plurality of beverage articles, comprising:
   providing at least one group of packs;
   manually loading the pack storing device with at least one pack from the at least one group of packs by one or more operators, and
   preparing, by the order-picking line, a further group of packs automatically or partly automatically from packs stored in the pack storing device so that based on a picking order a sequence of packs is formed from packs stored in the pack storing device and the formed sequence of packs is one of arranged or palletized on the further group of packs;
   the pack storing device comprising at least one storage lane, the at least one storage lane being at least one of configured and arranged such that the at least one pack can at least one of be driven thereon and be further transported by the dead weight of the pack, to an intended or predetermined area of the at least one storage lane;
   the at least one storage lane of the pack storing device comprising at least one receiving element for receiving the at least one pack from the one or more operators, wherein the at least one receiving element comprises a lateral pack guiding means; and
   the pack storing device comprising a plurality of vertically superposed planes.

2. The method according to claim 1, wherein providing the at least one group of packs comprises requesting the at least one group of packs.

3. The method according to claim 1, wherein for the one or more operators, a work area is arranged between the pack storing device and the at least one group of packs.

4. The method according to claim 1, further comprising an automated further processing of the packs after manual loading.

5. The method according to claim 1, wherein the at least one group of packs is a pallet.

6. The method according to claim 1, wherein the at least one group of packs comprises packs at least of a single beverage article.

7. The method according to claim 2, wherein requesting the at least one group of packs is by the one or more operators.

* * * * *